Aug. 15, 1933.    R. J. BRITTAIN, JR    1,922,076
GUARD OR SHIELD
Filed March 21, 1928
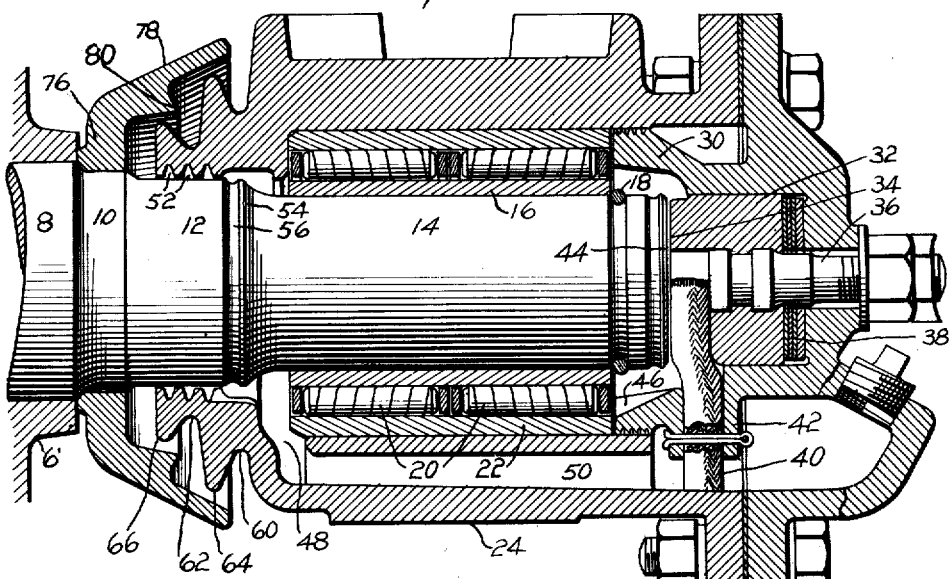
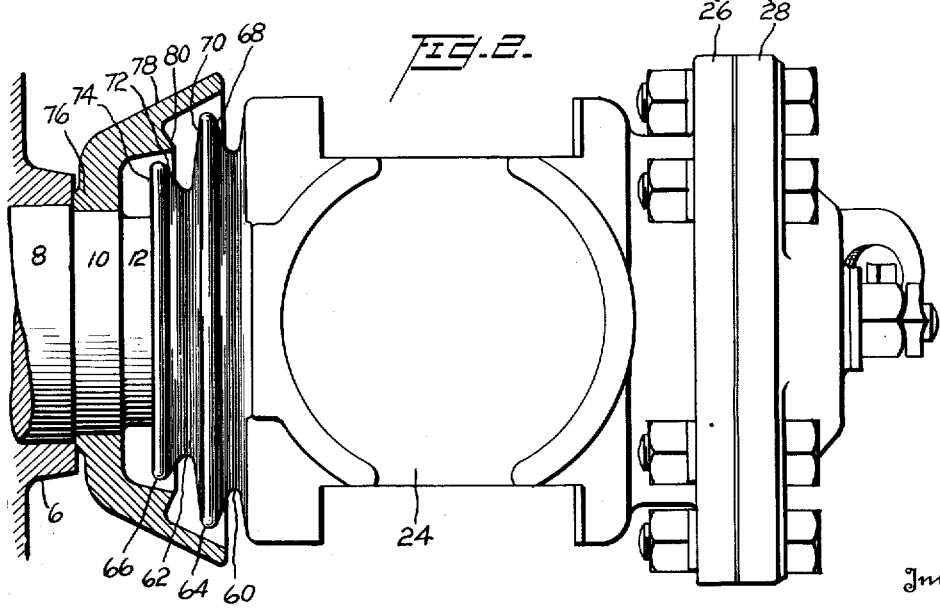
Inventor:
Richard J. Brittain, Jr,
By [signature]
His Attorney.

Patented Aug. 15, 1933

1,922,076

UNITED STATES PATENT OFFICE 1,922,076

GUARD OR SHIELD

Richard J. Brittain, Jr., Bloomfield, N. J., assignor to General Motors Corporation, Detroit, Mich., a Corporation of New Jersey Application March 21, 1928. Serial No. 263,302

3 Claims. (Cl. 286—5)

This invention relates to guards or shields and comprises all the features of novelty herein disclosed. An object of the invention is to provide an improved guard or shield for preventing the entrance of foreign matter to the bearing between a shaft and a casing. Another object is to provide improved devices for preventing the entrance of water to an axle box under all usual conditions. To these ends and also to improve generally and in detail upon devices of this character, the invention also consists in the various matters hereinafter described and claimed.

The invention, in its broader aspects, is not necessarily limited to the particular embodiment selected for illustration in the accompanying drawing in which Fig. 1 is a vertical section of a car axle box and adjacent parts and Fig. 2 is a plan view of the box with adjacent parts in horizontal section.

The numeral 6 indicates a wheel hub mounted on a shaft or axle 8 having a series of cylindrical surfaces 10, 12 and 14 of progressively decreasing size. A sleeve 16 is held on the surface 14 by a split ring 18 and supports roller bearings 20 running on a sleeve or lining 22 of an axle box or casing 24. The axle box or casing has an outwardly extending peripheral end flange 26 to which an end cap 28 is bolted, the end cap having an inwardly projecting annular flange or retaining ring 30 fittting the bore of the box or casing. A thrust block 32 having a thrust surface 34 for the end of the axle is held in a recess of the end cap by a central bolt 36, removable spacing plates 38 being interposed between the thrust block and the bottom of the recess to adjust the play between the end of the shaft or axle and the thrust surface 34. Lubricant is conveyed to the thrust surfaces by a wick 40 which extends from a lubricant reservoir in the box, through a boss 42 in the flange or retaining ring 30, to a recess of the thrust block. Oil which collects on a rib 44 at the end of the shaft is thrown into the retaining ring or flange 30 and drains through a notch 46 to the bearings. The oil must then traverse the bearings before returning to the reservoir through a vertical passage 48 and inclined return passage or core 50. The axle box or casing has grease grooves at 52 making a close joint with the cylindrical surface 12 of the shaft, and the shaft has a rib 54 and groove 56 to arrest creeping oil and deliver it to the passage 48.

The inner or rear end of the axle box or casing 24 is provided with a series of circumferential grooves alternating with collars or annular projections. In the illustrated construction, two grooves 60 and 62 and two spaced collars 64 and 66 are shown, the end collar 66 being of small diameter than the other one. The side walls 68 and 70 of the collar 64 converge outwardy and one side wall 72 of the collar 66 slants outwardly while the other side wall 74 is substantially straight or vertical. Pressed on the cylindrical surface 10 of the shaft is the hub portion 76 of a generally conical guard or shield 78. The shield flares outwardly towards the casing and surrounds and encloses the collars 64 and 66. From the inner surface of the shield, an annular projection or rib 80 extends into the space between the collars.

Water or other foreign matter falling on the shield is mostly diverted and drained towards the hub, especially when the axle is stationary. Whatever foreign matter works down the inner surface of the shield is arrested by the rib or projection 80 and drains off in the groove 62. Water running down the inner end of the casing 24 drains off in the groove 60. When the shaft or axle is rotating rapidly, the shield acts as a slinger to throw water or other foreign matter away from the casing. Water splashing upwardly from the wheel is diverted by the lower portion of the shield. Thus the construction is such as to preclude the admission of foreign matter to the casing or box under all usual conditions. In some instances, the shaft may be the stationary member and the casing may be the rotary member.

I claim:

1. In a device of the character described, a casing, a shaft projecting into the casing and journalled for rotation therein, the outer end of the casing closely surrounding the shaft and having its exterior surface formed with a plurality of peripheral drain grooves alternating with outwardly extending annular projections, the projection nearer the end of the casing being of smaller diameter than the next projection, a flaring shield outside the casing and surrounding the projections to protect the casing from foreign matter, the shield having an internal annular projection extending into the groove between two adjacent projections on the casing to obstruct the movement of foreign matter towards the shaft, and the shield also being fixed to the shaft whereby consequent rotation of the shield with the shaft will tend to throw foreign matter outwardly away from the casing and its exterior drain grooves; substantially as described.

2. In a device of the character described, a casing, a rotary shaft projecting into the casing and journalled for rotation therein, the outer end of the casing closely surrounding the shaft and having its exterior surface formed with an open, peripheral drain groove facing outwardly away from the shaft, a shield outside the casing and peripherally enclosing the drain groove to exclude foreign matter from the groove, the shield having an internal annular projection extending inwardly to the outwardly facing drain groove to obstruct the movement of foreign matter towards the hub of the shield, and the shield also having its hub fixed to the rotary shaft at the outer end of the casing whereby consequent rotation of the shield with the shaft will tend to throw foreign matter outwardly away from the casing and away from its exterior drain groove; substantially as described.

3. In a device of the character described, a casing, a rotary shaft projecting into the casing and journalled for rotation therein, the outer end of the casing closely surrounding the shaft and having its exterior surface formed with a peripheral drain groove open outwardly away from the shaft, one side wall of the groove being higher than the other side wall, a flaring shield outside the casing and peripherally enclosing the drain groove and its high and low side walls to exclude foreign matter from the outwardly open groove, the inner surface of the flaring shield having an annular projection extending inwardly towards the groove to obstruct the movement of foreign matter towards the hub of the shield, and the flaring shield also having its hub fixed to the rotary shaft at the outer end of the casing whereby consequent rotation of the shield with the shaft will tend to throw foreign matter outwardly away from the casing and its exterior drain groove; substantially as described.

RICHARD J. BRITTAIN, Jr.

CERTIFICATE OF CORRECTION.

Patent No. 1,922,076.   August 15, 1933.

RICHARD J. BRITTAIN, JR.

It is hereby certified that the State of Incorporation of the assignee in the above numbered patent was erroneously described and specified as "New Jersey" whereas said State of Incorporation should have been described and specified as Delaware, as shown by the records of assignments in this office; page 1, line 30, for "fittting" read fitting; line 57, for "small" read smaller; and line 59, for "outwardy" read outwardly; and that the said Letters Patent should be read with these corrections therein that the same may conform to the record of the case in the Patent Office.

Signed and sealed this 19th day of June, A. D. 1934.

Bryan M. Battey (Seal)   Acting Commissioner of Patents.

ing its exterior surface formed with an open, peripheral drain groove facing outwardly away from the shaft, a shield outside the casing and peripherally enclosing the drain groove to exclude foreign matter from the groove, the shield having an internal annular projection extending inwardly to the outwardly facing drain groove to obstruct the movement of foreign matter towards the hub of the shield, and the shield also having its hub fixed to the rotary shaft at the outer end of the casing whereby consequent rotation of the shield with the shaft will tend to throw foreign matter outwardly away from the casing and away from its exterior drain groove; substantially as described.

3. In a device of the character described, a casing, a rotary shaft projecting into the casing and journalled for rotation therein, the outer end of the casing closely surrounding the shaft and having its exterior surface formed with a peripheral drain groove open outwardly away from the shaft, one side wall of the groove being higher than the other side wall, a flaring shield outside the casing and peripherally enclosing the drain groove and its high and low side walls to exclude foreign matter from the outwardly open groove, the inner surface of the flaring shield having an annular projection extending inwardly towards the groove to obstruct the movement of foreign matter towards the hub of the shield, and the flaring shield also having its hub fixed to the rotary shaft at the outer end of the casing whereby consequent rotation of the shield with the shaft will tend to throw foreign matter outwardly away from the casing and its exterior drain groove; substantially as described.

RICHARD J. BRITTAIN, Jr.

CERTIFICATE OF CORRECTION.

Patent No. 1,922,076. August 15, 1933.

RICHARD J. BRITTAIN, JR.

It is hereby certified that the State of Incorporation of the assignee in the above numbered patent was erroneously described and specified as "New Jersey" whereas said State of Incorporation should have been described and specified as Delaware, as shown by the records of assignments in this office; page 1, line 30, for "fittting" read fitting; line 57, for "small" read smaller; and line 59, for "outwardy" read outwardly; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.

CERTIFICATE OF CORRECTION.

Patent No. 1,922,076. August 15, 1933.

RICHARD J. BRITTAIN, JR.

It is hereby certified that the State of Incorporation of the assignee in the above numbered patent was erroneously described and specified as "New Jersey" whereas said State of Incorporation should have been described and specified as Delaware, as shown by the records of assignments in this office; page 1, line 30, for "fittting" read fitting; line 57, for "small" read smaller; and line 59, for "outwardy" read outwardly; and that the said Letters Patent should be read with these corrections therein that the same may conform to the record of the case in the Patent Office.

Signed and sealed this 19th day of June, A. D. 1934.

Bryan M. Battey (Seal) Acting Commissioner of Patents.